United States Patent
Anglin et al.

(10) Patent No.: US 7,539,932 B2
(45) Date of Patent: May 26, 2009

(54) METHOD AND SYSTEM FOR DEBUGGING ETHERNET

(75) Inventors: Debbie Ann Anglin, Austin, TX (US);
Jon David Mason, Austin, TX (US);
Paul Nguyen, Austin, TX (US); Brian Michael Rzycki, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 557 days.

(21) Appl. No.: 10/870,536

(22) Filed: Jun. 17, 2004

(65) Prior Publication Data
US 2006/0036893 A1    Feb. 16, 2006

(51) Int. Cl.
*G06F 11/00* (2006.01)
(52) U.S. Cl. .................................... 714/799
(58) Field of Classification Search .................. 714/799
See application file for complete search history.

(56) References Cited

U.S. PATENT DOCUMENTS

| | | | | |
|---|---|---|---|---|
| 5,862,145 A | * | 1/1999 | Grossman et al. | 714/704 |
| 5,991,881 A | * | 11/1999 | Conklin et al. | 726/22 |
| 6,009,478 A | * | 12/1999 | Panner et al. | 710/5 |
| 6,098,179 A | * | 8/2000 | Harter, Jr. | 714/4 |
| 2004/0117534 A1 | * | 6/2004 | Parry et al. | 710/260 |
| 2005/0060598 A1 | * | 3/2005 | Klotz et al. | 714/4 |

* cited by examiner

*Primary Examiner*—Esaw T Abraham
*Assistant Examiner*—Enam Ahmed
(74) *Attorney, Agent, or Firm*—Robert A. Voigt; Diana R. Gerhardt (57) ABSTRACT

A system is disclosed and claimed for debugging Ethernet adapters and Ethernet adapter device drivers by automatically monitoring Ethernet adapter functionality and automatically turning on debug traces upon detecting incorrect Ethernet adapter functionality. An embodiment maintains a counter representing the number of incorrect Ethernet adapter functionality events minus the number of correct Ethernet adapter functionality events. If the counter reaches a threshold value, the Ethernet adapter device driver automatically enables debug traces for storing functionality information to a trace table.

13 Claims, 6 Drawing Sheets

METHOD AND SYSTEM FOR DEBUGGING ETHERNET

TECHNICAL FIELD

The present invention relates in general to data processing systems, and in particular to debugging Ethernet devices and drivers.

BACKGROUND INFORMATION

Ethernet is a network standard that can be used for interconnecting computers, printers, servers, and other computer devices within a building or campus. Such devices transmit information over networks using Ethernet packets. An Ethernet packet commonly contains a synchronization preamble, a destination address, a source address, a data field of varying size, and other information. Ethernet packets can be sent over Ethernet cable such as twisted wire, coax cable, or fiber optic cable. In the alternative, Ethernet packets can be sent using radio waves, infrared or other wireless means of communication.

A personal computer is an example of a network device that could communicate over Ethernet. Such communication by a personal computer over Ethernet could occur through hardware commonly-referred to as an Ethernet adapter. An Ethernet adapter is a unit that connects a network device to the Ethernet cable or other transmission medium. Like many other printed circuit boards associated with a personal computer, Ethernet adapters require a software driver to work correctly with the operating system and other computer hardware. For Ethernet adapters, the software driver is commonly referred to as an Ethernet device driver. An Ethernet adapter could also be referred to as an Ethernet controller.

In some operating systems such as AIX, an Ethernet device driver logs all driver error traces into the system trace table that resides in kernel memory. Enabling debug traces results in a loss of performance, therefore debug traces are not enabled by default. To avoid sacrificing performance, user intervention is needed in order to log debug traces. In the AIX operating system, for instance, a developer could type the command "entstat -t" from the Unix command line to turn on debug traces for an Ethernet device driver. To diagnose a problem, the developer can review stored debug trace information and use the information and the kernel dump to help identify the cause of the crash. In many cases however, before a developer can review the stored debug trace information, the developer must reboot a system, turn on debug traces to store information, and attempt to recreate a problem so that the stored information may be reviewed. This method of troubleshooting is time consuming and is often unsuccessful at repeating the symptoms that lead to a crash.

Present systems involving kernel crash dumps are limited due to the limited amount of memory allocated for troubleshooting a specific device such as an Ethernet adapter. Therefore, if an Ethernet device driver or Ethernet adapter has a problem, only a limited amount of information will be available in the debug traces for analysis by a developer. Furthermore, such information is often only available after attempts to recreate a crash after rebooting a system. Often in debugging a problem, a developer must ask his client to enable debug traces, attempt to recreate a problem, and then forward trace tables to the developer. Such a process is time-consuming and often ineffective. Further, if an Ethernet caused a fatal error, the traces in the trace table might not have enough information for debugging the problem.

What is needed is an improved method and apparatus for troubleshooting Ethernet adapters and Ethernet device drivers to allow developers a way of identifying the sources of problems before crashes occur.

SUMMARY OF THE INVENTION

The present invention addresses the foregoing needs by providing a method of detecting Ethernet adapter errors by enabling Ethernet error traces and detecting incorrect Ethernet adapter functionality. An embodiment of the present invention further increments a counter upon detection of incorrect Ethernet adapter functionality. The counter value is compared to a threshold value and debug traces are enabled if the counter value is greater than or equal to the threshold value. The counter decrements upon detecting correct Ethernet adapter functionality. In another embodiment, debug traces are disabled if the counter value is equal to zero or some other threshold value.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following description, numerous specific details are set forth such as specific thresholds, etc., to provide a thorough understanding of the present invention. In other instances, some details have been omitted as not necessary to obtain a complete understanding of the present invention because such details are within the skills of persons of ordinary skill in the relevant art. Embodiments and examples discussed herein are often described in terms of Ethernet adapter, Ethernet device driver, and the AIX operating system. These embodiments and examples are included for illustration purposes only and are not meant to limit the claims to a certain type of network adapter nor to a certain operating system environment.

Figure 1:
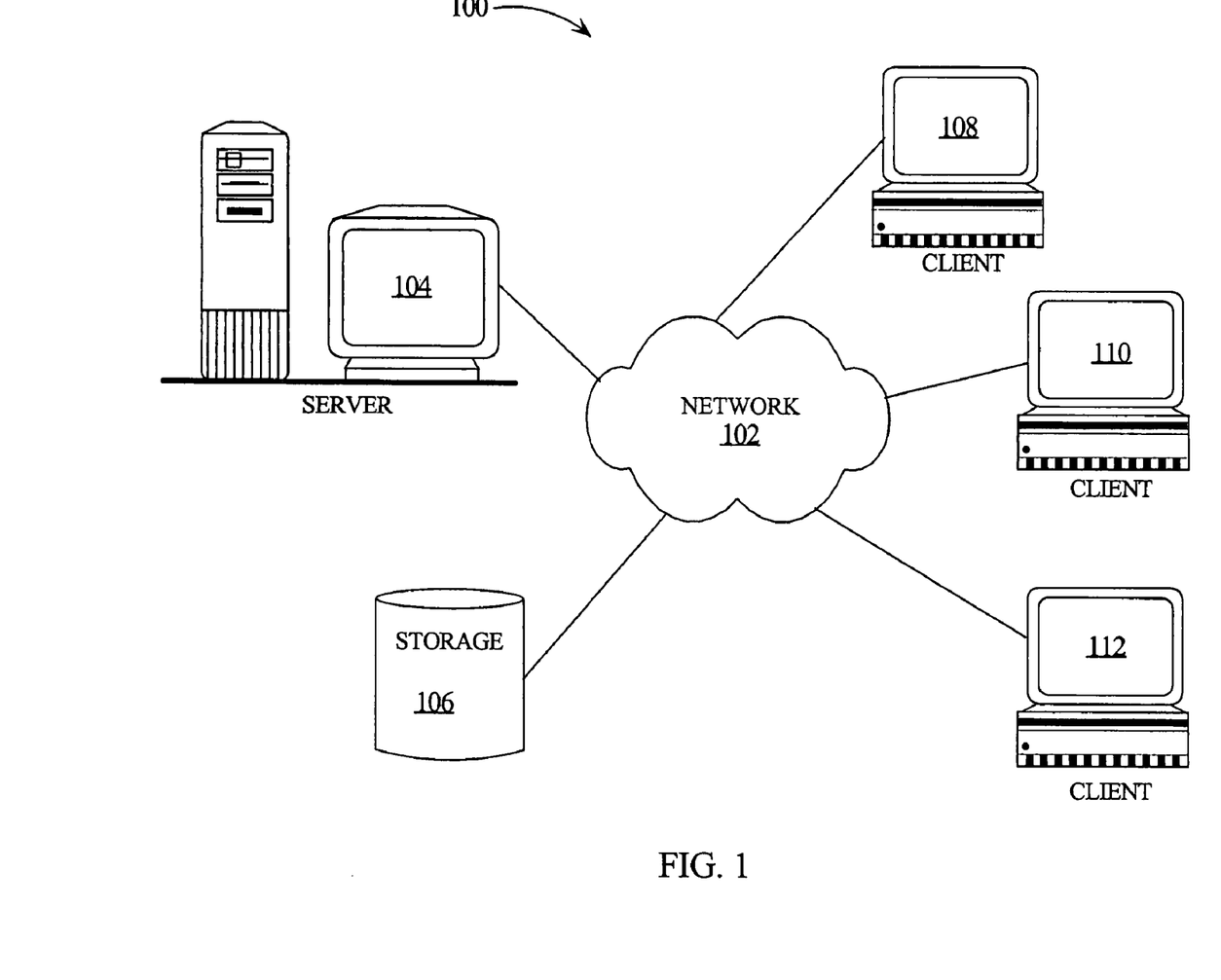
FIG. 1 is a pictorial representation of a distributed data processing system.

Referring now to FIG. 1, a pictorial representation of a distributed data processing system in which the present invention may be implemented is depicted. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, temporary connections made through telephone connections or wireless connections.

In the depicted example, a server 104 is connected to network 102 along with storage unit 106. In addition, clients 108, 110, and 112 also are connected to a network 102. These clients 108, 110, and 112 may be, for example, personal computers, printers or network computers. For purposes of this application, a network computer is any computer, coupled to a network, which receives a program or other application from another computer coupled to the network. In the depicted example, server 104 provides data, such as boot files, operating system images, and applications to clients 108-112. Clients 108, 110, and 112 are clients to server 104. Distributed data processing system 100 may include additional servers, clients, and other devices not shown. In an embodiment of the present invention, clients 108, 110, and 112 could be connected through individual Ethernet adapters to network 102. Also, server 104 could be connected to network 102 through an Ethernet adapter and network 102 could include Ethernet cable for sending Ethernet packets between server 104 and clients 108, 110, and 112. FIG. 1 is intended as an example and not as an architectural limitation for the systems of the present invention.

Figure 2:
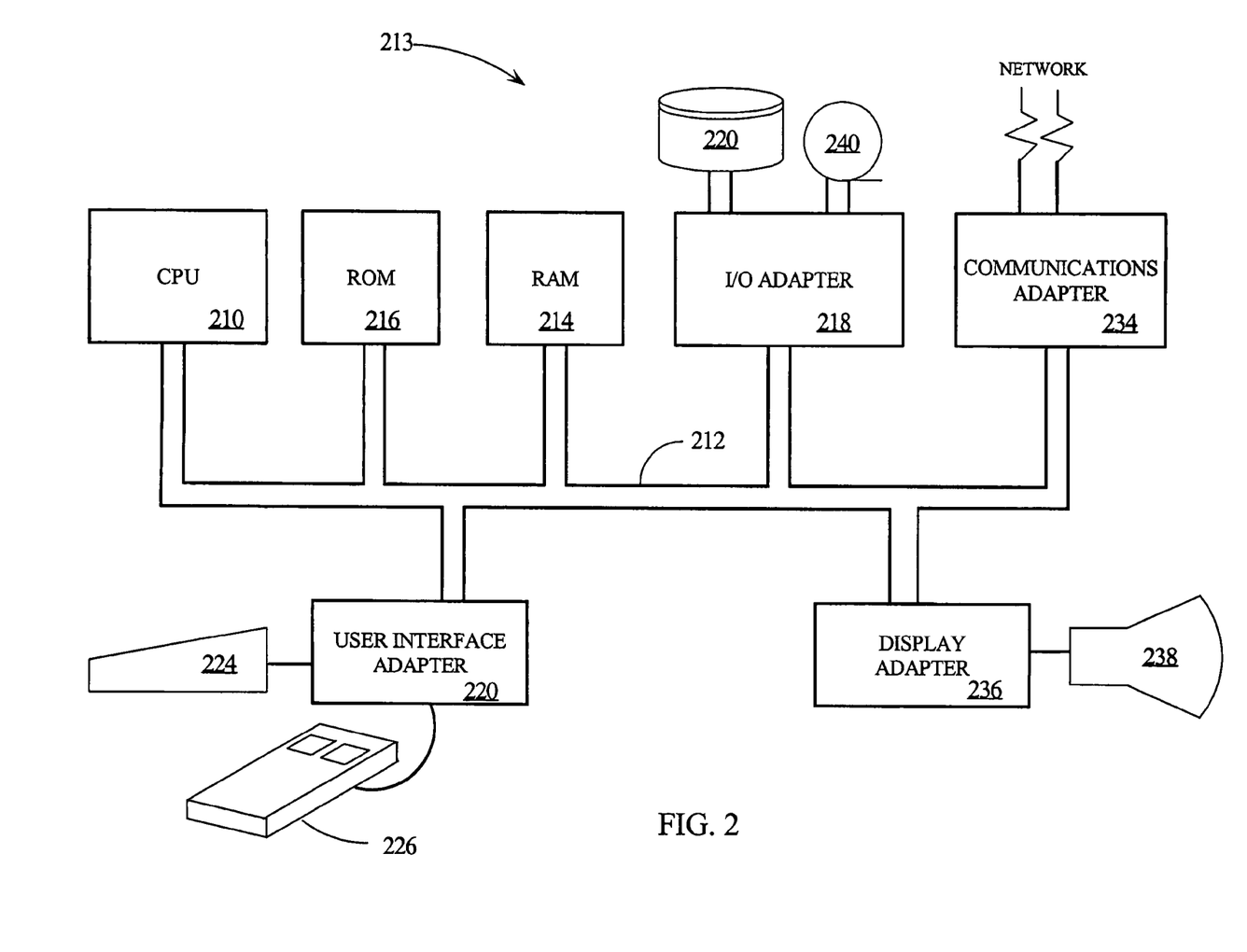
FIG. 2 illustrates a representative hardware environment for practicing the present invention.

A representative hardware environment for practicing the present invention is depicted in FIG. 2. A data processing system 213 could be, for example, a client computer 108 from FIG. 1. Referring now to FIG. 2, an exemplary hardware configuration of data processing system 213 is shown having central processing unit (CPU) 210, such as a conventional microprocessor, and a number of other units interconnected via system bus 212. Data processing system 213 could include random access memory (RAM) 214, read only memory (ROM) 216, and input/output (I/O) adapter 218 for connecting peripheral devices such as disk units 220 and tape drives 240 to bus 212. Data processing system 213 could include user interface adapter 222 for connecting keyboard 224, mouse 226, and/or other user interface devices such as a touch screen device (not shown) to bus 212. Further, processing system 213 could include communications adapter 234 for connecting data processing system 213 to a data processing network, and display adapter 236 for connecting bus 212 to display device 238. CPU 210 may include other circuitry not shown herein, which will include circuitry commonly found within a microprocessor, e.g., execution unit, bus interface unit, arithmetic logic unit, etc. CPU 210 may also reside on a single integrated circuit. Communications adapter 234 could be any network adapter such as an Ethernet adapter. Disk unit 220 could be any computable readable medium and could be used for storing a network adapter device driver in conjunction with the present invention.

The trace facility of an operating system, such as AIX, is useful for observing a running device driver and system. The trace facility captures a sequential flow of time-stamped system events, and can provide a fine level of detail on system activity. Events are shown in time sequence and in the context of other events. The trace facility is useful in expanding the trace event information to understand how and why an event happened.

The trace facility helps a developer isolate system problems by monitoring selected system events. Events that can be monitored include: entry and exit to selected subroutines, kernel routines, kernel extension routines, and interrupt handlers. When the trace facility is active, information about these events is recorded in a system trace log file or trace table.

The trace facility includes commands for activating and controlling traces and generating trace reports. Applications and kernel extensions can use several subroutines to record additional events. The default trace file in AIX is /var/adm/ras/trcfile. The trace table can be stored in a portion of memory 214 that is set aside by the kernel as kernel memory.

An operating system such as AIX is shipped with many predefined trace hook identifiers. A trace hook identifier can also be referred to as an event identifier. In a kernel crash dump, there can be a system trace table with trace points from many different device drivers. A trace hook identifier tells a developer the origin of a trace point. A trace hook identifier can be a three-digit hexadecimal number that identifies an event being traced. An Ethernet device driver can have unique trace hook identifiers for captured information regarding transmit packets, receiving packets, and other parameters.

The "entstat" command in the AIX operating system displays the statistics gathered by the specified Ethernet device driver. The purpose of the entstat command includes providing statistics related to the functionality of Ethernet device drivers and Ethernet adapters. Such statistics can be used by a developer to determine potential problems in a networked system. Example statistics available through the "entstat" command include: "Packets," the number of packets transmitted successfully by the device; "Bytes," the number of bytes transmitted successfully by the device; "Interrupts," the number of transmit interrupts received by the driver from the adapter; "Transmit Errors," the number of output errors encountered on this device; "Packets Dropped," the number of packets accepted by the device driver for transmission which were not given to the device; "Max Packets on S/W Transmit Queue," the maximum number of outgoing packets ever queued to the software transmit queue; "S/W Transmit Queue Overflow," the number of outgoing packets which have overflowed the software transmit queue; "Current S/W+H/W Transmit Queue Length," the number of pending outgoing packets on either the software transmit queue or the hardware transmit queue; "Broadcast Packets," the number of broadcast packets transmitted without any error; "Multicast Packets," the number of multicast packets transmitted without any error; "No Carrier Sense," the number of unsuccessful transmissions due to the no carrier sense error; "DMA Underrun," the number of unsuccessful transmissions due to the DMA underrun error; "Lost CTS Errors," the number of unsuccessful transmissions due to the loss of the Clear-to-Send signal error; "Max Collision Errors," the number of unsuccessful transmissions due to too many collisions; "Late Collision Errors," the number of unsuccessful transmissions due to the late collision error; "Deferred," the number of outgoing packets deferred (that the adapter had to defer while trying to transmit a frame) during transmission; "SQE Test," contains the number of "Signal Quality Error" Tests (i.e. Heartbeat) performed successfully during transmission; "Timeout Errors," the number of unsuccessful transmissions due to adapter reported timeout errors; "Single Collision Count," the number of outgoing packets with single (only one) collision encountered during transmission; "Multiple Collision Count," the number of outgoing packets with multiple collisions encountered during transmission; "Current HW Transmit Queue Length," the number of outgoing packets which currently exist on the hardware transmit queue; "CRC Errors," the number of incoming packets with the Checksum (FCS) error; "DMA Overrun," the number of incoming packets with the DMA overrun error; "Alignment Errors," the number of incoming packets with the alignment error; "No Resource Errors," the number of incoming packets dropped by the hardware due to the no resource error;

"Receive Collision Errors," the number of incoming packets with the collision errors during the reception; "Packet Too Short Errors," the number of incoming packets with the length error indicating that the packet size is less than the Ethernet minimum packet size; "Packet Too Long Errors," the number of incoming packets with the length error indicating that the packet size is bigger than the Ethernet maximum packet size; "Packets Discarded by Adapter," the number of incoming packets dropped by the hardware for any other reasons; and "Receiver Start Count," the number of times that the receiver (receive unit) on the adapter has been started.

In addition to these conditions, other conditions can be monitored for correct functionality. Monitoring such conditions provides a developer with statistics regarding correct functionality of an Ethernet adapter. However, the statistics could be accessed or generated automatically by an Ethernet device driver to determine the correct functionality of a networked system. An embodiment of the present invention automatically accesses such statistics in determining correct functionality of a network adapter communicating over a networked system.

In addition to providing statistics to a developer, the "entstat" command used with a "-t" flag can turn on the debug trace in some Ethernet adapter device drivers. Prior to the present invention, a developer in an AIX environment might use the "entstat" command to manually toggle debug traces related to an Ethernet adapter. An embodiment of the present invention is an Ethernet device driver that automatically enables debug traces upon the detection of any incorrect functionality on the part of the Ethernet adapter or Ethernet device driver. Such a system provides a developer with information for easier debugging of problems, without the need for manually toggling debug traces. Further, such a system prevents a developer from having to restart a system, enable debug traces, and attempt to recreate a problem.

Figure 3:
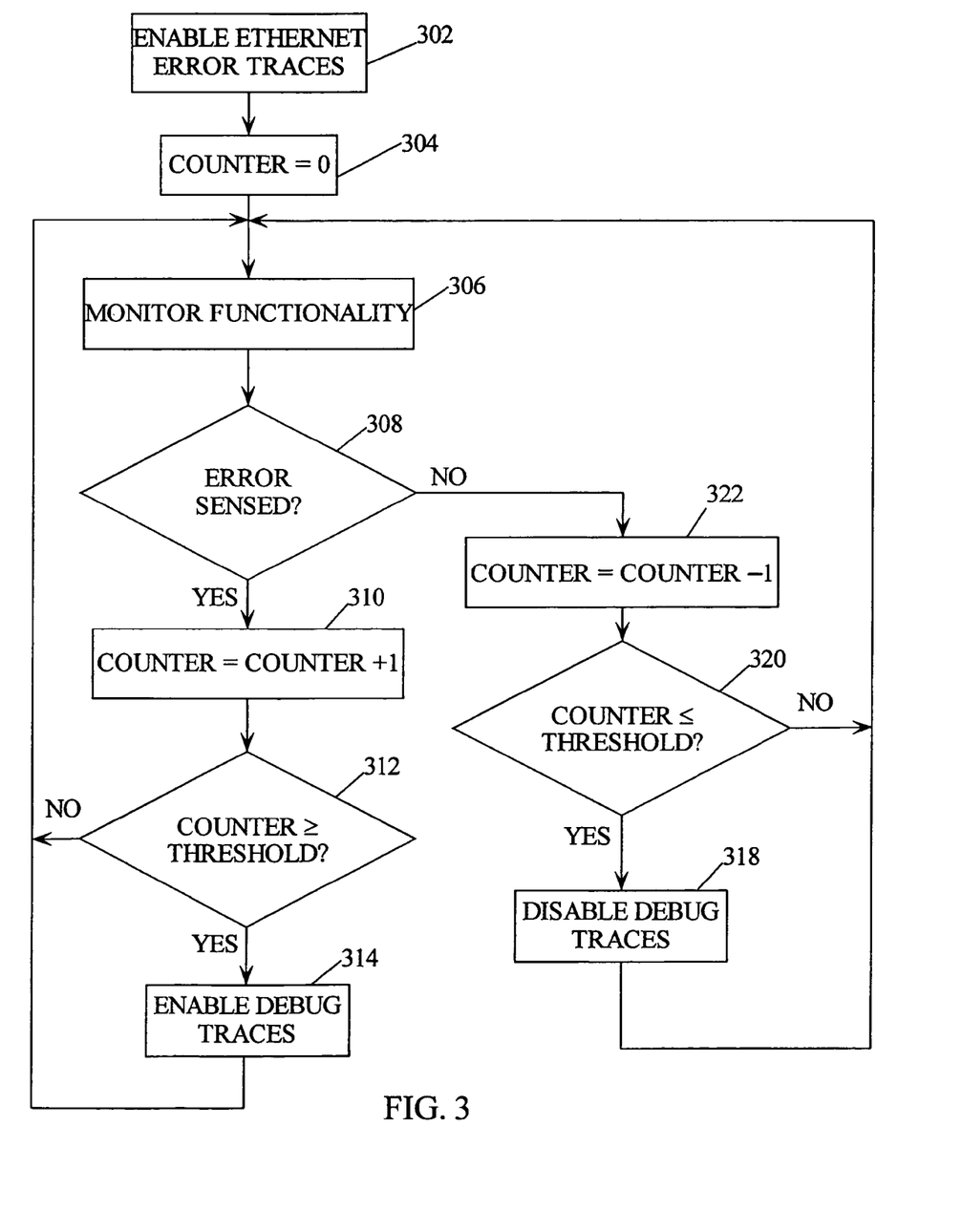
FIG. 3 is a flow chart depicting steps of an embodiment of the present invention.

FIG. 3 is a flowchart representing steps of an embodiment of the present invention. In step 302, Ethernet error traces are enabled. In some operating systems, error traces are enabled by default. A variable for counting errors is initialized in step 304. The functionality of the Ethernet adapter is monitored 306. In an embodiment operating in conjunction with the AIX operating system, an Ethernet adapter driver automatically monitors functionality by accessing the entstat command. In the alternative, the Ethernet adapter could monitor 306 functionality by calling other subroutines, functions, or macros written to access the functionality characteristics of the Ethernet adapter. In an embodiment, the Ethernet adapter driver could compare the observed functionality with a database of stored functionality characteristics. By doing so, the Ethernet adapter driver could determine whether the Ethernet adapter was functioning correctly. If an error is detected by step 308, the counter is incremented in step 310. Examples of potential errors that would trigger the system to increment the error counter would be a dropped link, a transmit timeout, an interrupt which is unclaimed, a frozen PCI bus, or other such errors as discussed herein. If the error counter reaches a threshold value, then debug traces are enabled in step 314. Step 312 in FIG. 3 represents the determination of whether the threshold value has been reached. For example, a developer may specify that debug traces are enabled after twenty-five instances of abnormal behavior. An alternative step not shown in FIG. 3 would be to target the trace of the suspected problem. If no error is detected in step 308, then the counter may be decremented in step 322. This optional step is a way to allow a developer to offset negative behavior by the Ethernet adapter with positive behavior to prevent the enabling of debug traces for a system which is operating substantially correctly. If the counter reaches zero or a second threshold value in step 320, then the debug traces are disabled in step 318 and the system cycles back to step 306 for further monitoring of the Ethernet adapter. If the counter is not equal to zero or less than the second threshold value in step 320, the system continues to monitor the behavior beginning at step 306 with the debug traces still enabled.

Figure 4:
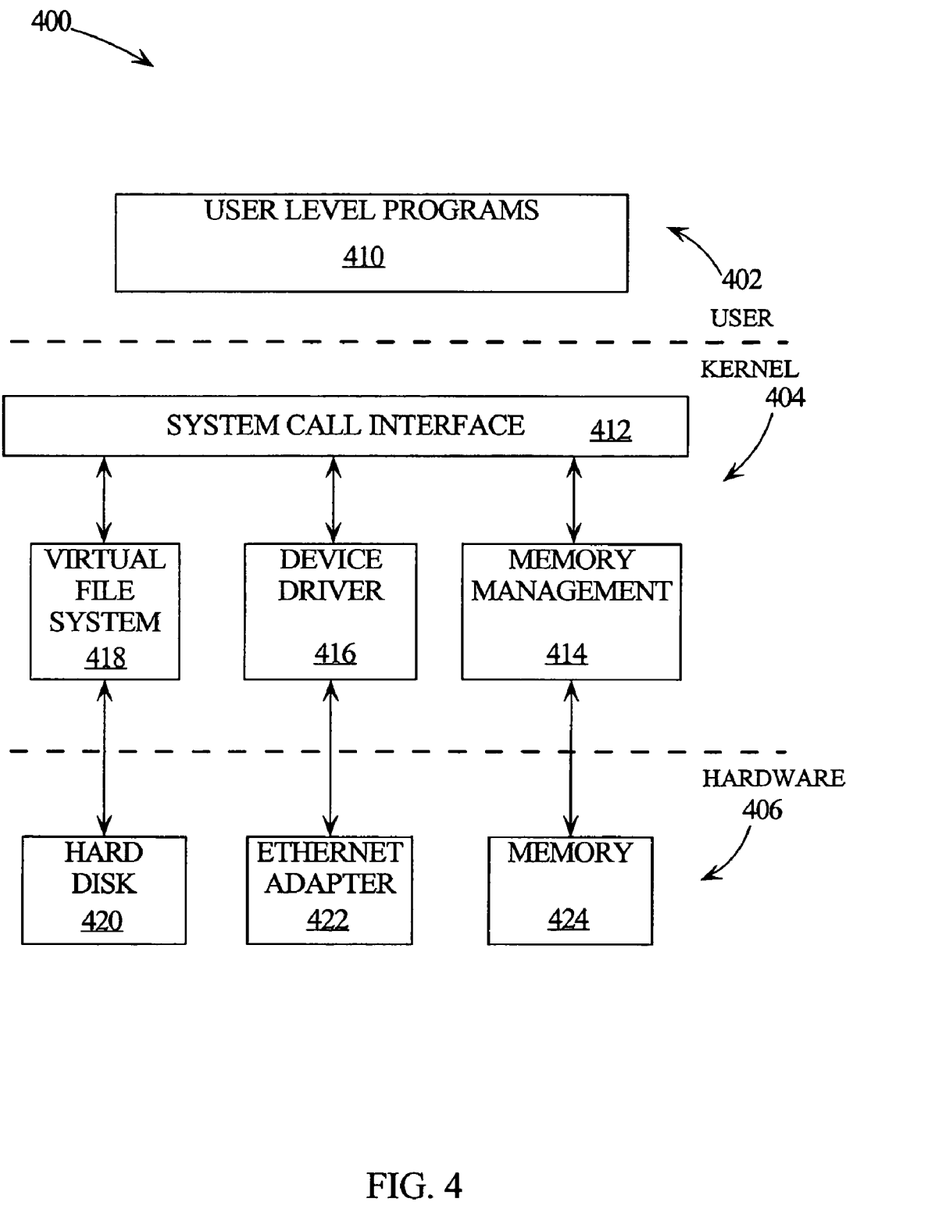
FIG. 4 is a diagram of an example operating system architecture.

Referring now to FIG. 4, a simplified diagram is shown of how an operating system kernel 404 interacts with hardware 406 and user level space 402. A kernel 404 may consist of several subparts including for example a virtual file system 418, a device driver 416, and memory management 414. Memory management 414 can perform tasks including assigning memory areas and swap space areas to processes. An example of device driver 416 could be an Ethernet device driver. Memory management 414 could be responsible for assigning memory for trace tables used in the present invention. Debug traces could be stored in trace tables residing in memory 424. In an alternative, trace tables and debug traces could be stored to hard disk 420, or any other computer readable medium. In an embodiment of the present invention, a database of network adapter characteristics could be stored on hard disk 420 or memory 424. Ethernet device driver 416 could monitor functionality of Ethernet adapter 422, access the database, compare the functionality of Ethernet adapter 422 to stored Ethernet adapter characteristics, and thereby determine whether Ethernet adapter 422 was demonstrating correct functionality.

Figure 5:
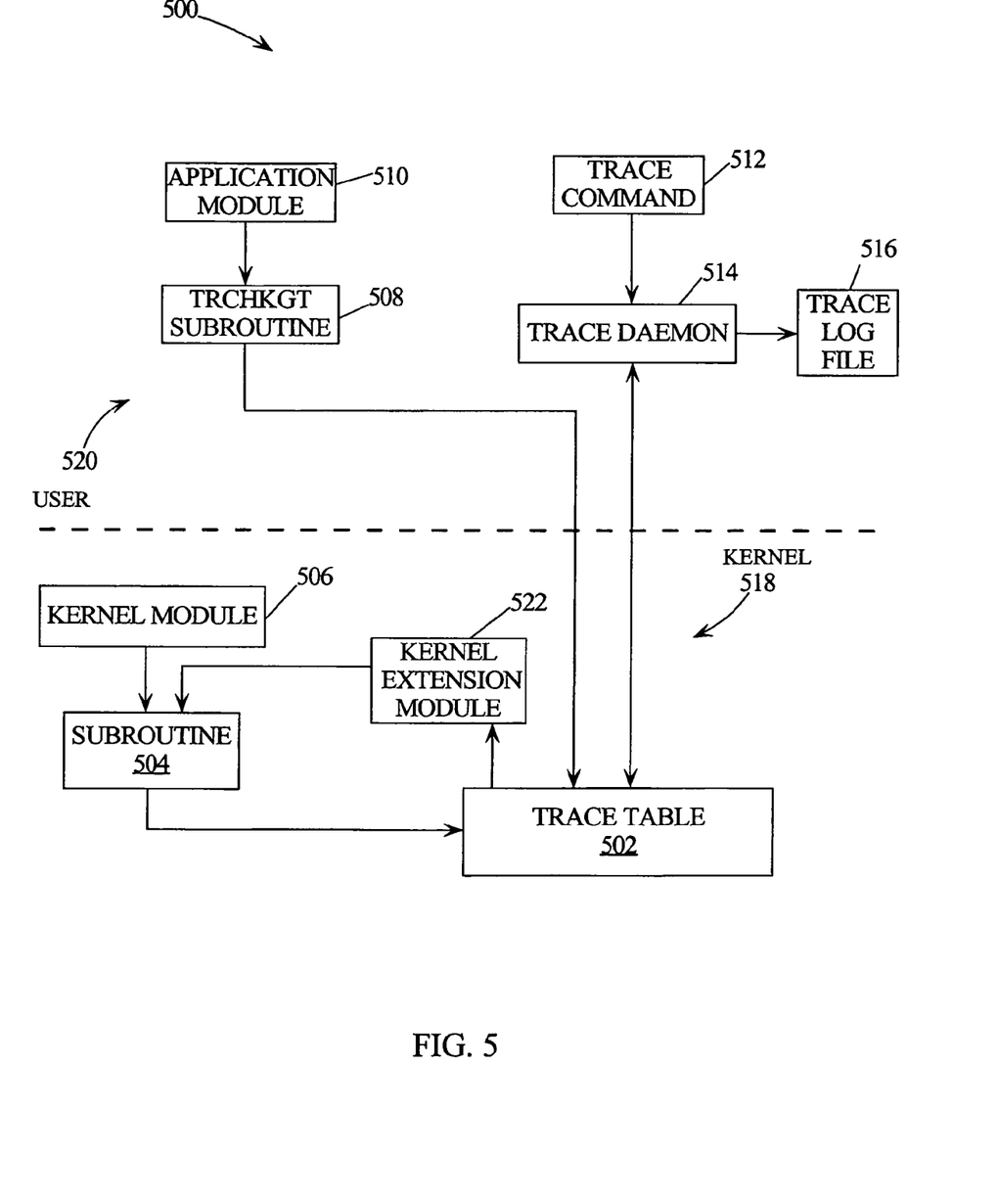
FIG. 5 is a diagram of an example trace facility of an operating system.

In an embodiment, an Ethernet device driver automatically enables debug traces by accessing the trace facility of an operating system. Referring now to FIG. 5, an operating system trace facility 500 is depicted that may be used in conjunction with an embodiment of the present invention. The operating system is divided between kernel space 518 and user space 520. In order for a developer to capture the flow of events for a device such as an Ethernet adapter, a developer can activate traces 512 to capture the flow of events for the Ethernet device. Kernel 506 could call subroutine 504 to record events to trace table 502. A trace daemon 514 could access trace table 502 and generates trace log file 516. A daemon such as trace daemon 514 could be any background process used for handling a low-level operating system task such as accessing the trace table 502. In an embodiment of the present invention, kernel extension module 522 automatically accesses trace table 502. Kernel extension module 522 could be, for example, Ethernet device driver 416 from FIG. 4. Trace table 502 could be stored in kernel memory set aside in ram 214 by memory manager 414.

In an embodiment, each error detected by the device driver is counted as an instance of incorrect functionality. In another embodiment, a database of functionality parameters is stored for later access in determining whether observed Ethernet adapter functionality qualifies as incorrect. For example, when a device driver detects errors associated with Timeout, the device driver could access the database with stored parameters for determining incorrect functionality based on Timeout errors. In an alternative embodiment, parameters stored in the database could be used for weighting or scoring instances of incorrect functionality. For example, a database could have stored a weight of 10 for "Timeout" errors. Also, the database could have stored a weight of 20 for a "No Carrier Sense" error. Using such a weighting scheme, each instance of a No Carrier Sense error would count double when compared to a Timeout error. Using weighting, a developer can instruct the device driver to assign a value to a particular type of problem. The summation of weighted instances of errors is then compared against a threshold value. The use of databases and weighting can provide a developer with robust forms of determining incorrect Ethernet adapter functionality.

Figure 6:
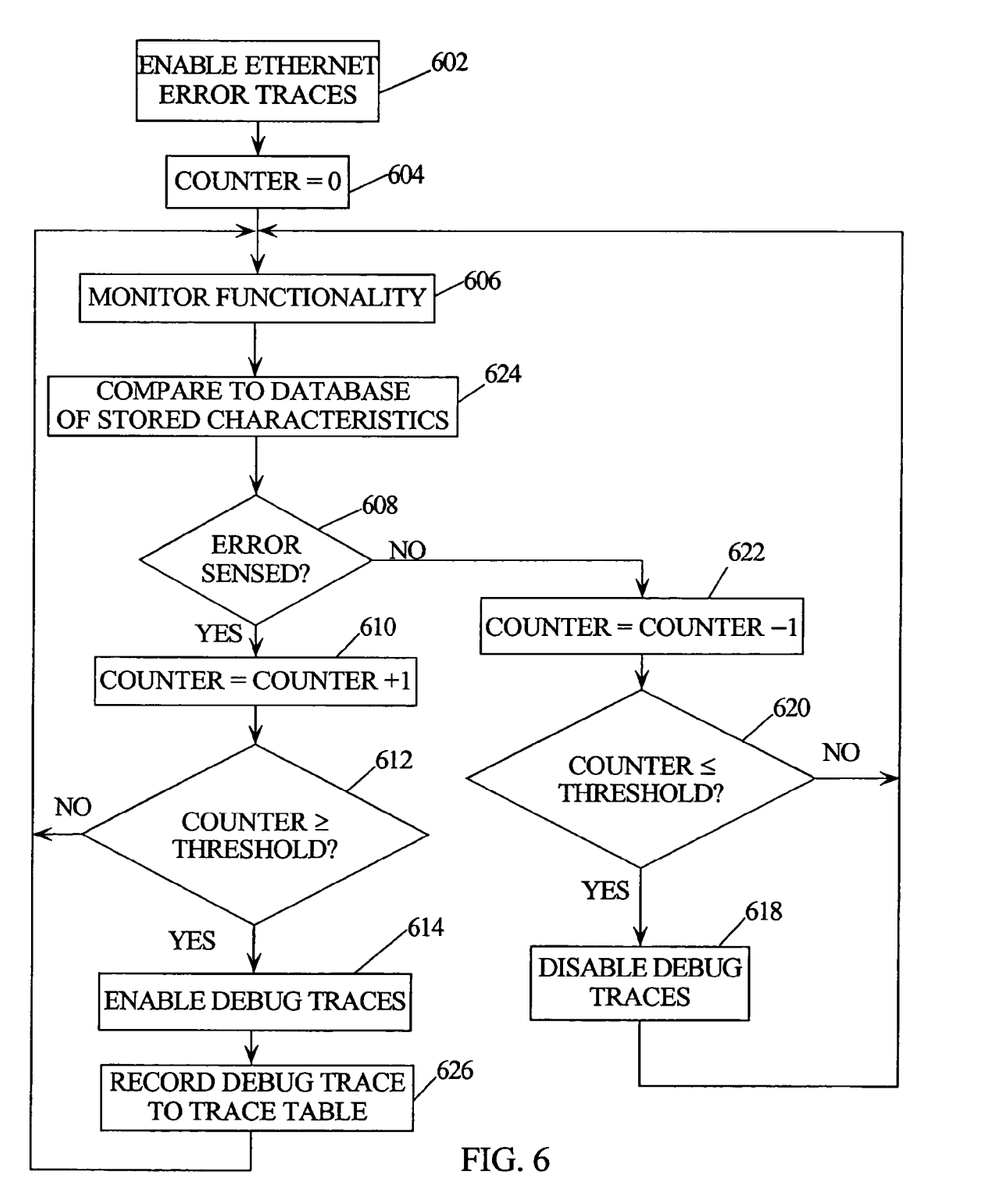
FIG. 6 is a flow chart depicting steps of an embodiment of the present invention.

FIG. 6 is a flowchart representing steps of an embodiment of the present invention. In step 602, Ethernet error traces are enabled. In some operating systems, error traces are enabled by default. A variable for counting errors is initialized in step 604. The functionality of the Ethernet adapter is monitored 606. In an embodiment operating in conjunction with the AIX operating system, functionality could be monitored by the Ethernet adapter driver automatically accessing the entstat command. In the alternative the Ethernet adapter could monitor 606 functionality by calling other subroutines, functions, or macros written to access the functionality characteristics of the Ethernet adapter. In an embodiment, the Ethernet adapter driver could compare the observed functionality with a database of stored functionality characteristics. By doing so, the Ethernet adapter driver could determine whether the Ethernet adapter was functioning correctly. If an error is detected by step 608, the counter is incremented in step 610. Examples of potential errors that would trigger the system to increment the error counter would be a dropped link, a transmit timeout, an interrupt which is unclaimed, a frozen PCI bus, or other such errors as discussed herein. If the error counter reaches a threshold value, then debug traces are enabled in step 614. Step 612 in FIG. 6 represents the determination of whether the threshold value has been reached. For example, a developer may specify that debug traces are enabled after twenty-five instances of abnormal behavior. An alternative step not shown in FIG. 6 would be to target the trace of the suspected problem. If no error is detected in step 608, then the counter may be decremented in step 622. This optional step is a way to allow a developer to offset negative behavior by the Ethernet adapter with positive behavior to prevent the enabling of debug traces for a system which is operating substantially correctly. If the counter reaches zero or a second threshold value in step 620, then the debug traces are disabled in step 618 and the system cycles back to step 606 for further monitoring of the Ethernet adapter. If the counter is not equal to zero or less than the second threshold value in step 620, the system continues to monitor the behavior beginning at step 606 with the debug traces still enabled.

Although the present invention and its advantages have been described in detail, it should be understood that various changes, substitutions and alterations could be made herein without departing from the spirit and scope of the invention as defined by the appended claims.

What is claimed is:

1. A method of detecting network adapter errors comprising the steps of:
   enabling network adapter error traces;
   detecting incorrect network adapter functionality, wherein detecting incorrect network adapter functionality comprises comparing observed network adapter functionality to a database of stored network adapter functionality characteristics;
   incrementing a counter responsive to detected incorrect network adapter functionality wherein the counter has a counter value equal to the number of times the counter is incremented minus the number of times the counter is decremented;
   comparing the counter value to a first threshold value;
   enabling debug traces if the counter value is greater than the first threshold value;
   decrementing the counter upon detecting correct network adapter functionality; and
   disabling the debug traces when the counter value becomes less than a second threshold value.

2. The method of claim 1, wherein the network adapter is an Ethernet adapter.

3. The method of claim 1, further comprising the step of recording a debug trace to a trace table.

4. The method of claim 3, wherein the trace table is an internal trace table operably coupled to network adapter device driver.

5. A method for automatically recording debug traces for a network adapter comprising the steps of:
   detecting incorrect network adapter functionality, wherein detecting incorrect network adapter functionality comprises comparing observed network adapter functionality to a database of stored network adapter functionality characteristics;
   incrementing a counter responsive to detected incorrect network adapter functionality wherein the counter has a counter value equal to the number of times the counter is incremented minus the number of times the counter is decremented;
   comparing the counter value to a first threshold value;
   enabling debug traces if the counter value is greater than the first threshold value;
   decrementing the counter upon detecting correct network adapter functionality; and
   disabling the debug traces when the counter value becomes less than a second threshold value.

6. The method of claim 5, wherein the step of enabling debug traces occurs automatically through a network adapter driver accessing a trace function of an operating system.

7. The method of claim 5, wherein the network adapter is operably coupled to a network adapter driver, the network adapter driver is operably coupled to an operating system wherein the operating system has a trace function for recording functionality information, and wherein the step of enabling debug traces occurs automatically by the network adapter driver accessing the trace function of the operating system.

8. The method of claim 7, wherein the network adapter is an Ethernet adapter.

9. The method of claim 8, wherein the operating system is a Unix-based operating system.

10. The method of claim 1, wherein the network functionality statistics are gathered from a specified Ethernet device driver utilizing an entstat command.

11. The method of claim 10, wherein the network functionality statistics are selected from a group consisting of a number of packets transmitted successfully, a number of transmit interrupts received, a number of output error encountered, and a number of packets dropped.

12. The method of claim 5, wherein the network functionality statistics are gathered from a specified Ethernet device driver utilizing an entstat command.

13. The method of claim 12, wherein the network functionality statistics are selected from a group consisting of a number of packets transmitted successfully, a number of transmit interrupts received, a number of output error encountered, and a number of packets dropped.

* * * * *